United States Patent
Ma et al.

(10) Patent No.: US 8,054,863 B2
(45) Date of Patent: Nov. 8, 2011

(54) RANGING SYSTEM AND METHOD

(75) Inventors: Yugang Ma, Singapore (SG); Xiaobing Sun, Singapore (SG); Kanzo Okada, Tokyo (JP); Jian Zhang, Singapore (SG); Junjun Wang, Singapore (SG)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 12/132,776

(22) Filed: Jun. 4, 2008

(65) Prior Publication Data

US 2008/0298432 A1 Dec. 4, 2008

(30) Foreign Application Priority Data

Jun. 4, 2007 (SG) .................. 200703957-1

(51) Int. Cl.
*H04B 1/00* (2006.01)
(52) U.S. Cl. ...................................... 375/130
(58) Field of Classification Search ............... 375/130, 375/132, 142, 147, 150, 257, 259, 316, 340; 342/42, 68, 70, 107, 134, 352, 357.35, 458
See application file for complete search history.

(56) References Cited

U.S. PATENT DOCUMENTS

| | | | | |
|---|---|---|---|---|
| 4,797,679 A | * | 1/1989 | Cusdin et al. ............... | 342/387 |
| 5,519,400 A | * | 5/1996 | McEwan ..................... | 342/28 |
| 6,054,950 A | * | 4/2000 | Fontana ....................... | 342/463 |
| 6,239,741 B1 | | 5/2001 | Fontana et al. | |
| 6,925,108 B1 | * | 8/2005 | Miller et al. ................ | 375/150 |
| 7,042,868 B2 | | 5/2006 | Runkle | |
| 7,057,553 B2 | | 6/2006 | Jandrell | |
| 7,110,473 B2 | * | 9/2006 | Miller et al. ................ | 375/316 |
| 7,171,303 B1 | | 1/2007 | Nordmark et al. | |
| 2002/0061080 A1 | * | 5/2002 | Richards et al. ............. | 375/346 |

(Continued)

FOREIGN PATENT DOCUMENTS

WO  WO 2007/011098  1/2007

OTHER PUBLICATIONS

Sinan Gezici et al., "Localization via Ulta-Wideband Radios", IEEE Signal Processing Magazine, pp. 70-83, vol. 22, Jul. 2005.

(Continued)

*Primary Examiner* — Dac Ha
*Assistant Examiner* — Syed Haider
(74) *Attorney, Agent, or Firm* — Finnegan, Henderson, Farabow, Garrett & Dunner, LLP

(57) ABSTRACT

A system for estimating range to an object comprising a system for estimating range to an object comprising a transmitter to transmit at least one UWB signal, a receiver to receive at least one UWB signal, a sampler to sample the received UWB signal depending on a plurality of clock and/or sample pulses having a first frequency, and a circuit and/or processor configured to generate a fractional signal having a second frequency that is lower that the first frequency and a phase that is dependant on the delay between when the UWB signal is actually received and when the received UWB signal is first sampled, and determine the range based on at least a first number of clock or sample pulses between transmitting and receiving the UWB signal and the phase of the fractional signal. Also a method of estimating range to an object.

13 Claims, 6 Drawing Sheets

U.S. PATENT DOCUMENTS

| | | |
|---|---|---|
| 2003/0095609 A1* | 5/2003 | Cowie et al. .................. 375/316 |
| 2005/0068225 A1* | 3/2005 | Inoue et al. ..................... 342/70 |
| 2005/0069052 A1* | 3/2005 | Carbonari ..................... 375/316 |
| 2005/0156780 A1* | 7/2005 | Bonthron et al. ............. 342/107 |
| 2005/0170778 A1* | 8/2005 | Uchiyama et al. ........... 455/41.2 |
| 2005/0179585 A1 | 8/2005 | Walker et al. |
| 2006/0106546 A1* | 5/2006 | Roberts et al. .................. 702/27 |

OTHER PUBLICATIONS

Search and Examination Report mailed Jan. 18, 2010, from the Austrian Patent Office in corresponding Singapore Application No. 200703957-1.

* cited by examiner (a)

(b)

(c)

RANGING SYSTEM AND METHOD

CROSS REFERENCES TO RELATED APPLICATIONS

The present invention contains subject matter related to Singapore Patent Application No. 200703957-1, filed in the Singapore Patent Office on Jun. 4, 2007, the entire contents of which being incorporated herein by reference.

BACKGROUND OF THE INVENTION

1. Field of the Invention

The present invention relates to estimation of time of arrival and/or range, particularly though not solely to a method and system for estimating range based on the time of arrival of an Ultra Wide Band (UWB) signal.

2. Description of Related Art

Methods for estimating position or range are widely used in many wireless devices. For example it is known to use a pulse-based UWB transceiver system to estimate the range to an object or between devices by determining the delay between transmission and receipt of each UWB pulse, which is also known as the Time of Arrival (TOA). Such systems may be used in applications such as radar, object location or tracking, and military applications.

In FIG. 1 shows prior art system for range estimation using TOA, as disclosed by Sinan Gezici, Zhi Tian, Georgios B. Giannakis, Hisashi Kobayashi, Andreas F. Molisch, H. Vincent Poor, and Zafer Sahinoglu, in "Localization via ultra-wideband radios." *IEEE Signal Processing Magazine*, vol. 22, 2005. While a number of methods of range estimation exist, the TOA method for range estimation has particular advantages when used with UWB signals. The TOA method includes sending a coded UWB pulse 100 from the transmitter. The receiver receives the reflected pulse 101, as shown in FIG. 1(*a*), which is smoothed using an envelope detector or a low pass filter. Then the envelope is sampled and becomes time discrete samples 102, as shown in FIG. 1(*b*). The TOA of each pulse is estimated based on these discrete samples, for example the number of clock pulses between transmission and receipt.

A sampling error may occur as the estimated TOA 104 may be different from the actual TOA 106, as shown in FIG. 1(*c*). The discrete time sampling step and low time resolution of the sampler, means a TOA between two sample points will not be identified. That is to say, that the accuracy is limited by the sampling rate. Therefore the lower the sampling rate, the bigger the possible sampling error.

Various systems have been proposed in the prior art. For example a positioning system is disclosed in U.S. Pat. No. 7,171,303 that uses a common clock unit to form the sampling basis in both the local receiver and the relative sensor. Both the local receiver and the relative sensor have the same reference during the ranging processing. In U.S. Pat. No. 7,057,553 a method for processing the positioning signals in the global positioning system (GPS) is disclosed. The method collects pseudo-range samples from positioning signals received at the ranging receiver from several satellites. U.S. Pat. No. 7,042,868 discloses a ranging method between two packet signal transceivers. The time delay or distance between two transceivers can be determined through sending and received packet signals to each other. U.S. Pat. No. 6,239,741 describes a tunnel diode detector for UWB object detection.

The present inventors have also filed Singapore Patent Application No. 200604221-2 on Jun. 23, 2006, relating to a method using a time to voltage converter to estimate the TOA.

SUMMARY OF THE INVENTION

In general terms the invention relates to determining the delay between when a UWB signal is actually received and when the received UWB signal is first sampled. This may have the advantage that a timing difference smaller than the sampling period can be detected without undue hardware complexity and/or that a high sampling rate is not necessary.

In one specific expression of the invention there is provided a method of estimating range to an object comprising:
transmitting at least one UWB signal,
receiving at least one UWB signal,
sampling the received UWB signal depending on a plurality of clock and/or sample pulses having a first frequency,
providing a fractional signal having a second frequency that is lower that the first frequency and a phase that is dependent on the delay between when the UWB signal is actually received and when the received UWB signal is first sampled, and
determining the range based on at least a first number of clock or sample pulses between transmitting and receiving the UWB signal and the phase of the fractional signal.

In a second independent specific expression of the invention there is provided a system for estimating range to an object comprising:
a transmitter to transmit at least one UWB signal,
a receiver to receive at least one UWB signal,
a sampler to sample the received UWB signal depending on a plurality of clock and/or sample pulses having a first frequency, and
a circuit and/or processor configured to generate a fractional signal having a second frequency that is lower that the first frequency and a phase that is dependant on the delay between when the UWB signal is actually received and when the received UWB signal is first sampled, and determine the range based on at least a first number of clock or sample pulses between transmitting and receiving the UWB signal and the phase of the fractional signal.

BRIEF DESCRIPTION OF THE DRAWINGS

In order that one or more aspects of invention may be more readily understood and put into practical effect, there shall now be described, by way of non-limitative example only, one or more embodiments of the inventions, with reference to and as illustrated by the accompanying drawings; in which.

DETAILED DESCRIPTION OF THE PREFERRED EMBODIMENTS

Figure 1:
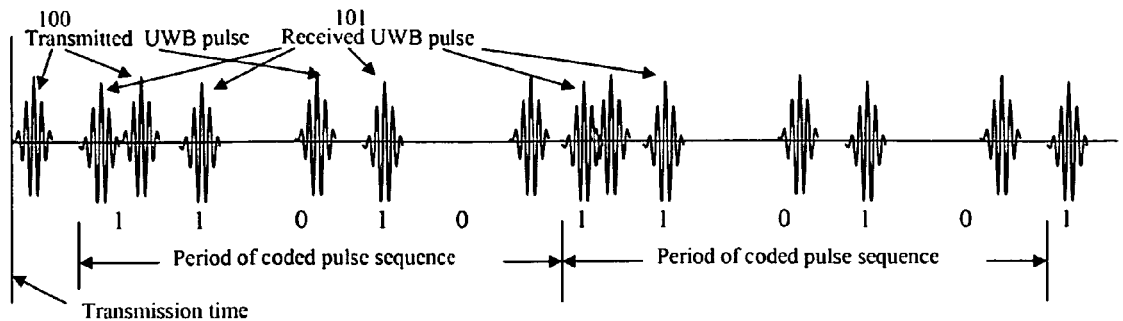
FIG. 1 is a graph of a prior art method of TOA estimation
(a) The UWB pulse sequence
(b) The envelope detection and sampling
(c) The sampling output and TOA estimation error
Figure 1:
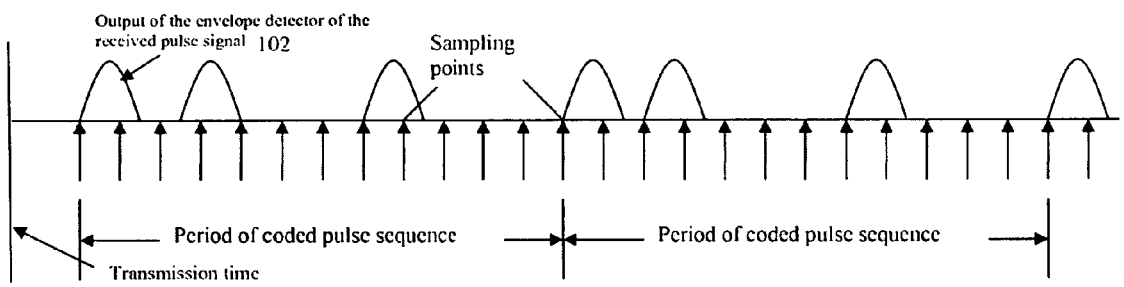
Figure 1:
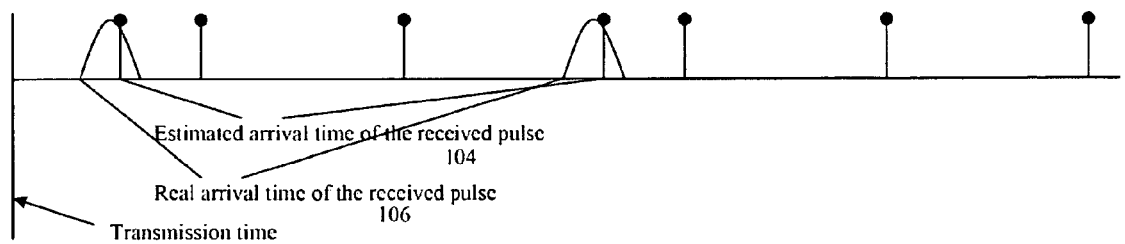
Figure 2:
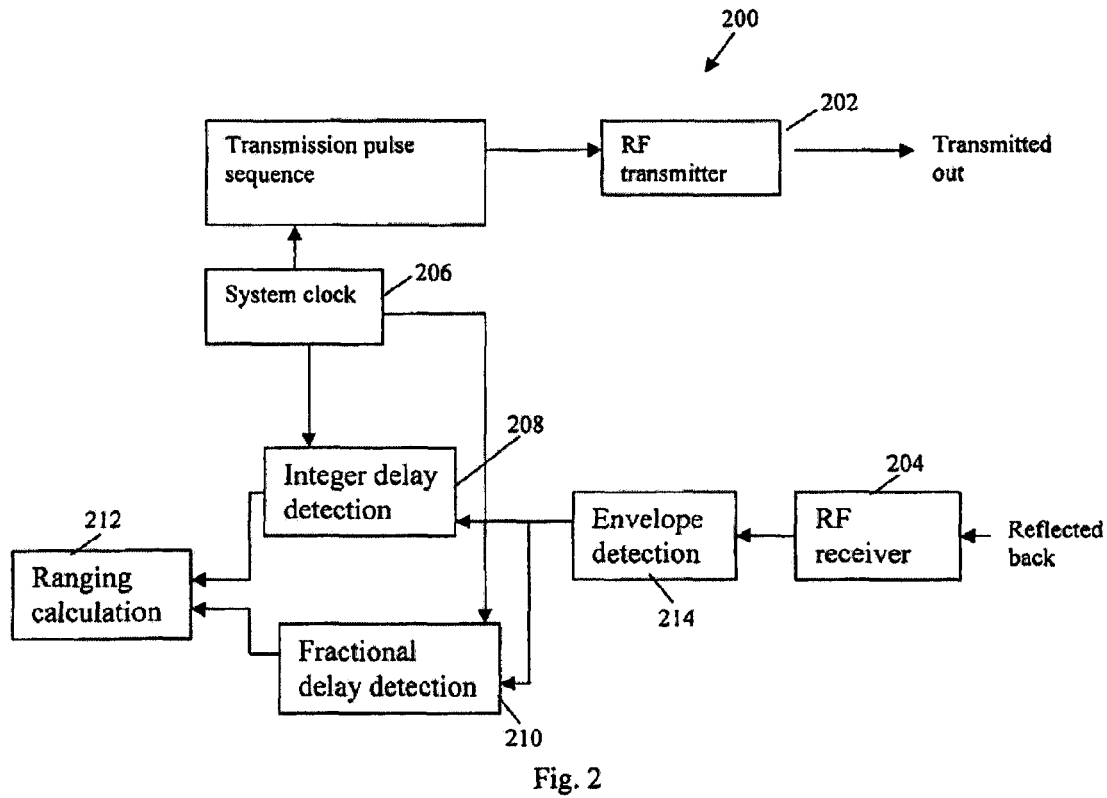
FIG. 2 is a block diagram of the ranging system according to an exemplary embodiment.

An exemplary embodiment is shown in FIG. 2 for estimating the TOA of a UWB signal. The system 200 includes a transmitter 202 for generating the UWB signal and a receiver 204 for receiving the reflected UWB signal. Typically the transmitter 202 sends a reference signal out and the receiver 204 receives the echo reference signal from the target object. By detecting the delay between the transmitting the signal and receiving the signal the distance to the object can be found.

A clock 206 provides timing pulses to the transmitter 202, which generates the coded pulses according to a preset pattern. Where repeated pulse coding is used, the maximum delay should not be longer in the time domain than the UWB pulse code length. The receiver 204 is connected to an integer delay detection 208 and a fractional delay detection 210. The integer delay detection 208 determines the number of integer clock pulses between transmitting the UWB pulse, and receiving the reflected UWB pulse. The fractional delay detection 210 determines the delay between the first clock pulse after the reflected UWB signal is received and when the reflected UWB signal is actually received.

Figure 3:
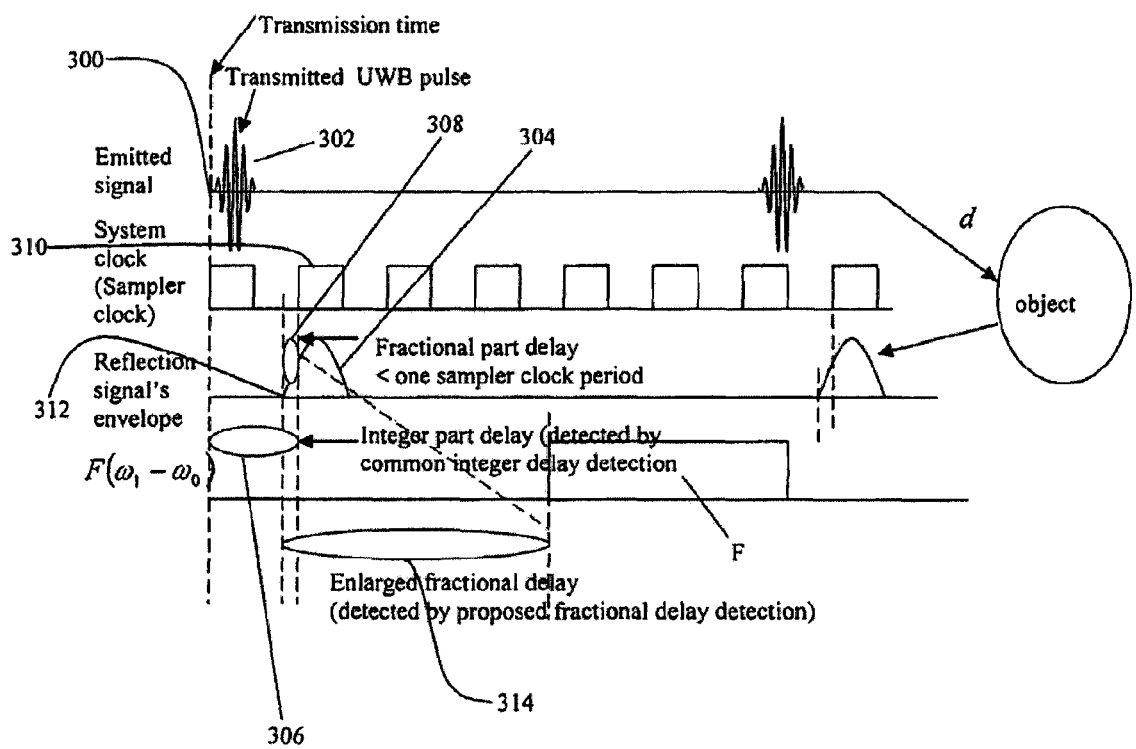
FIG. 3 is a graph showing the relationship between the signals in the system of FIG. 2.

The relationship between integer delay detection 208 and fractional delay detection is 210 shown in FIG. 3. The integer delay 306 is the time (measured in the number of clock pulses or samples) from when the UWB pulse 302 is transmitted 300 to the first sample 310 after the UWB pulse 304 is received. As explained in the background section the UWB pulse 304 may be received in between samples. Consequently the fractional delay 308 is the time from when the UWB pulse 304 is actually received 312 to the first sample 310 after the UWB pulse 304 is received. The actual time when the UWB pulse is received 312 may be determined as when the envelope of the signal from the receiver 204 is above a threshold.

Therefore the total delay or actual TOA may be calculated by subtracting the fractional delay 308 from the integer delay 306. A ranging calculation (212 FIG. 2) is based on the total delay.

In order to determine the fractional delay 308, a fractional signal F is generated. The fractional signal F has a lower frequency than the clock frequency and a phase 314 which is dependant on the delay between the first clock or sample pulse after the UWB signal is received and actually receiving the UWB signal. Because F has a large period relative to the sampling period, a small relative change in timing between the when the reflected UWB pulse is actually received and the first sample after it is received will result in a bigger change in the phase 314 of F. The phase of signal F represents a temporal expansion of the fractional delay 308, so that the fractional delay 308 can be measured using the standard sampling frequency.

Figure 4:
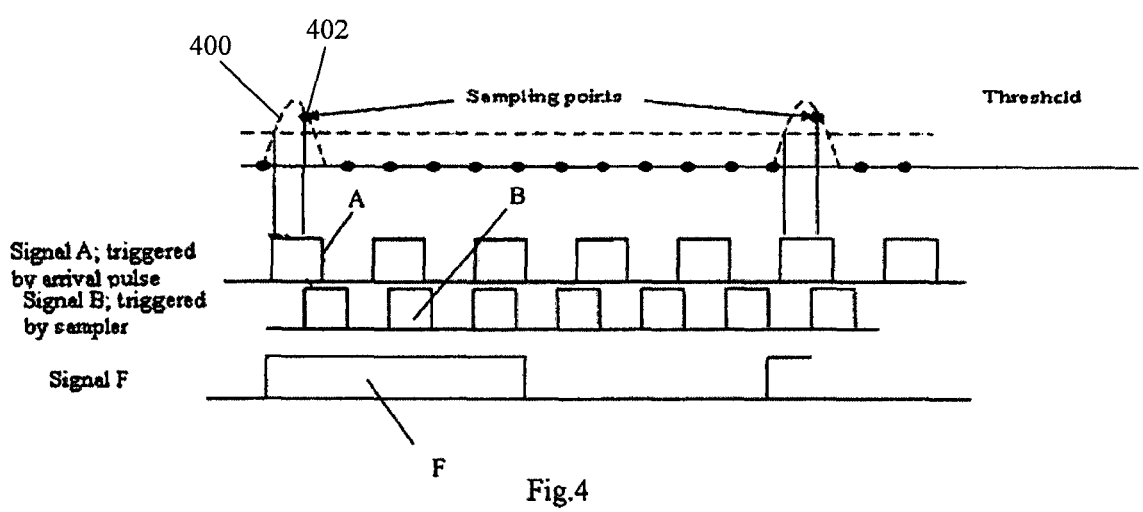
FIG. 4 is a graph of signal A and B triggered by the arrival pulse edge and the sampler clock in the system of FIG. 2.

An example method of fractional delay detection 210 is shown in FIG. 4. Two signals A and B are generated. Signal A is in phase with the received UWB pulse 400 with frequency $\omega_0$, which is slightly slower than the sampling frequency $\omega_1$. Signal B is in phase with the first clock or sample pulse 402 after the UWB signal is received and has a frequency the same as the sampling frequency $\omega_1$.

A further signal C is generated by the multiplication of signals A and B as shown in Equation (1):

$$C = A(\omega_0) \cdot B(\omega_1) \tag{1}$$

Signal C can be separated in the frequency domain into two parts. A first part signal D is the high frequency part centered at a frequency of $\omega_0 + \omega_1$ and a second part signal F is the low frequency part centered at a frequency of $\omega_0 - \omega_0$. Thus signal C can also be represented as shown in Equation (2):

$$C = D(\omega_0 + \omega_1) + F(\omega_1 - \omega_0) \tag{2}$$

Because signals D and F have significantly different frequencies, a low pass filter may be used to extract the low frequency part $F(\omega_1 - \omega_0)$. The high frequency part $D(\omega_1 - \omega_0)$ may be discarded.

The signal $F(\omega_1 - \omega_0)$ has a long period relative to the sampling period, because $\omega_1$ is close to $\omega_0$. The phase of signal F will vary in accordance with the delay between the first clock or sample pulse after the UWB signal is received and when the UWB signal is actually received. Therefore the fractional delay 308 can be determined by sampling the phase 314 of F.

A factor or multiplier K by which the fractional delay 308 is expanded in the time domain into the phase 314 of $F(\omega_1 - \omega_0)$ can be calculated as shown in Equation (3):

$$K = \frac{\omega_1}{\omega_1 - \omega_0} \tag{3}$$

For example, if the sampling frequency $\omega_1$ is 100 MHz, and $\omega_0$ is 99 MHz then $F(\omega_1 - \omega_0)$ has a frequency of 1% of $\omega_1$ or 1 MHz. This gives a resolution of 100 samples over the possible range of fractional delay of 10 ns (one sample period). This makes it easy to use a relatively low speed sampling frequency to obtain higher time resolution by sampling $F(\omega_1 - \omega_0)$ instead of only sampling the received signal. In the above example, the time resolution of the pulse arrival time detection is improved by two orders of magnitude from 10 ns to 100 ps (10 ns/100).

The period of $F(\omega_1 - \omega_0)$, namely $2\pi/(\omega_1 - \omega_0)$, must be smaller than the period of coded pulse sequence. Otherwise, $F(\omega_1 - \omega_0)$ can't be processed in time because it will overlay with the next coming pulse signal.

Figure 5:
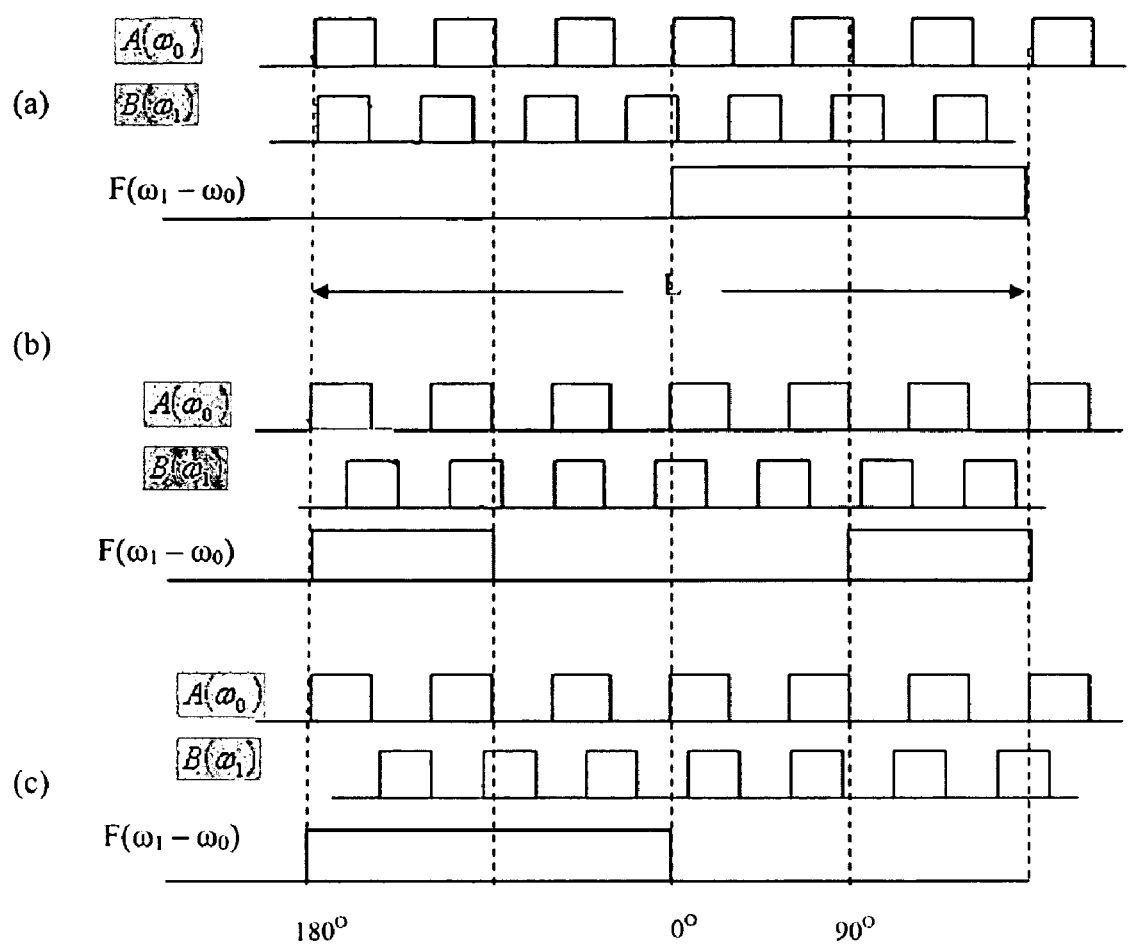
FIGS. 5(*a*)-(*c*) are graphs of the phase change of the signal F along with the pulse arrival time change.

For example as shown in FIGS. 5(a)-(c) the phase of F varies depending on the fractional delay. In FIG. 5(a) the signal is received at the same time as a sampling pulse (factional delay is zero), and according the phase of F is shown as 0°. In FIG. 5(b) a small factional delay exists and accordingly the phase of F is 90°. In FIG. 5(c) a large fractional delay exists and accordingly the phase of F is 180°.

Integer delay detection 208 may be implemented by starting a Counter1 when the UWB signal is transmitted and stopping the Counter1 when the sampled received signal is higher than a threshold, (i.e. the first clock pulse after the UWB pulse is received). The integer delay $\tau_1$ is calculated according to Equation (4):

$$\tau_1 = N_1 \cdot T \tag{4}$$

where $N_1$ is value of Counter1, T is the sample period.

Fractional delay detection 210 may be implemented by starting a Counter2 when the envelope of the signal from the receiver is above a threshold, and stopping the Counter2 when $F(\omega_1 - \omega_0)$ changes state, (i.e. the number of clock pulses represent the phase of F). The fractional delay $\tau_f$ is calculated according to Equation (5):

$$\tau_f = N_f \cdot T/K \tag{5}$$

where $N_f$ is the value of Counter2. Therefore total delay or actual TOA $\Delta$ can be calculated according to Equation (6):

$$\Delta = \tau_1 - \tau_f \tag{6}$$

The total delay or actual TOA $\Delta$ may be used to calculate range or position. For example in an UWB ranging system, the distance d between the transceiver and the object is proportional to the delay or actual TOA of the received signal as compared with the emitted signal, as shown in Equation (7):

$$d = (\Delta - X) \cdot \zeta/2 \tag{7}$$

where X is a known constant circuit delay and ζ is the speed of propagation for example the speed of light.

Figure 6:
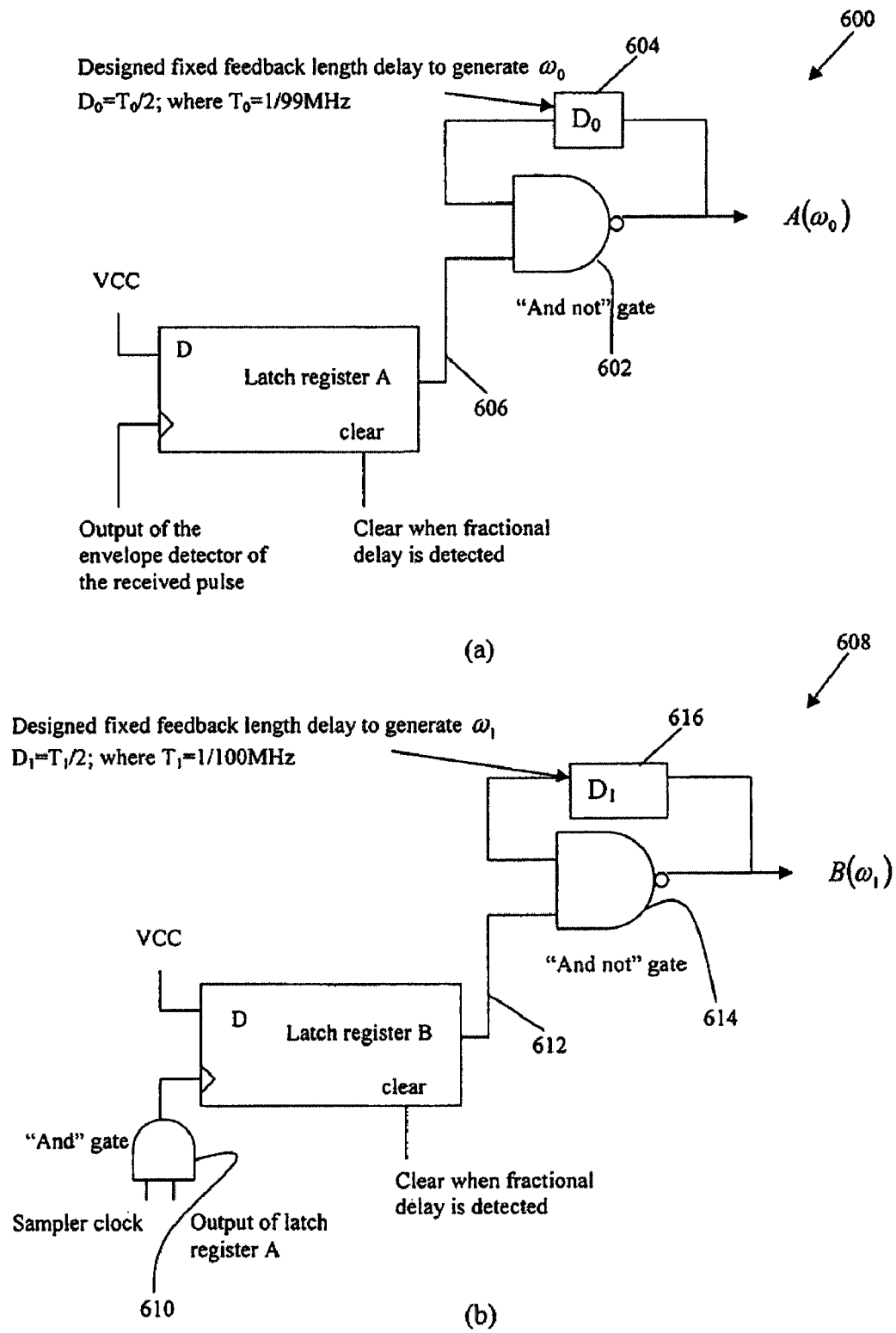
FIGS. 6(*a*)-(*c*) are circuit diagrams of the hardware for generating signals A, B and $F(\omega_1-\omega_0)$.
Figure 6:
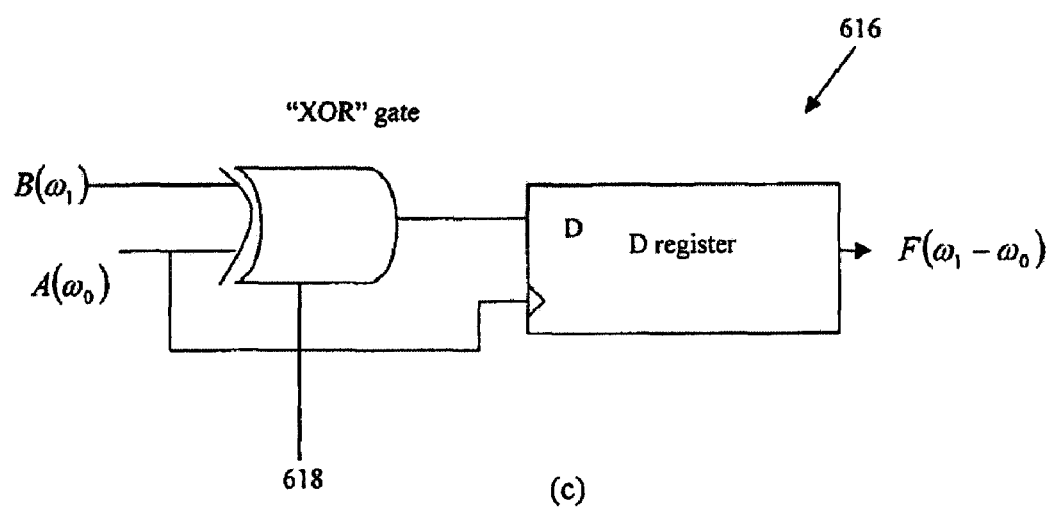

FIG. 6 shows a hardware implementation for fractional delay detection 210. Signals $A(\omega_0)$ and $B(\omega_1)$ are generated by two feedback oscillation circuits 600, 608.

In FIG. 6(a), the first oscillator circuit 600 receives output of the envelope detector (214 FIG. 2) which is supplied to a clock input of a latch register A. When the envelope detector 214 output rises above a threshold (detects a UWB pulse arrival), the latch register A output 606 will be high, which causes a feed back oscillator 602 to oscillate. The frequency of the oscillation is determined by the feedback line 604 length, which is set at $D_0$ which results in a frequency of $\omega_0$. The latch register A will be cleared to zero when $F(\omega_1-\omega_0)$ changes state stopping the oscillation or the next pulse arrives.

In FIG. 6(b), the second oscillator circuit 608 is used to generate signal $B(\omega_1)$. The latch register A's output 606 is combined at an AND gate 610 with the clock pulses. The output of the AND gate 610 is supplied to a clock input of latch register B. The latch register B output 612 will be high after the first clock pulse after a UWB pulse arrival. This causes a feed back oscillator 614 to oscillate. The frequency of the oscillation is determined by the feedback line 616 length, which is set at $D_1$ which results in a frequency of $\omega_1$, which is also stopped once $F(\omega_1-\omega_0)$ changes state or the next pulse arrives.

In FIG. 6(c), a further circuit 616 is shown. The signals $A(\omega_0)$ and $B(\omega_1)$ from circuits 600 608 are sent to an XOR gate 618 which is equivalent to a mixer or multiplication which results in signal C. Signal C from the XOR gate 618 is provided to the clock input of a latch register D to sample and hold the XOR results. $A(\omega_0)$ is supplied to the clock input of a latch register D so that signal C is sampled and registered at $\omega_0$. This is equivalent to a low-pass filter which results in signal $F(\omega_1-\omega_0)$ at the output.

Whilst the preferred embodiments of the invention have been described in detail, many variations are possible within the scope of the invention as will be clear to a skilled reader.

What is claimed is:

1. A method of estimating range to an object comprising:
   transmitting at least one UWB signal;
   receiving at least one UWB signal;
   sampling the received UWB signal depending on a plurality of clock and/or sample pulses having a first frequency;
   providing a fractional signal having a second frequency that is lower than the first frequency and a phase that is dependent on the delay between when the UWB signal is actually received and when the received UWB signal is first sampled, wherein providing the fractional signal comprises:
      starting an oscillation signal $^A$ when the UWB signal is received, signal $^A$ having a third frequency which is similar to the first frequency;
      starting an oscillation signal $^B$ when the first clock or sample pulse occurs after signal $^A$ starts, signal $^B$ having a fourth frequency which has a relatively small frequency difference to the third frequency;
      multiplying signals $^A$ and $^B$ to generate signal $^C$; and
      providing the lower frequency component of signal $^C$ as the fractional signal; and
   determining the range based on at least a first number of clock or sample pulses between transmitting and receiving the UWB signal and the phase of the fractional signal.

2. The method as claimed in claim 1 wherein the phase of the fractional signal is determined relative to when the UWB signal is received.

3. The method as claimed in claim 2 wherein the first number of clock pulses is determined by starting a first counter, which outputs a first number of clock pulses, when the UWB signal is transmitted and stopping the first counter when the received UWB signal is sampled.

4. The method as claimed in claim 3 wherein the phase of the fractional signal is determined by starting a second counter, which outputs a second number of clock pulses, when the UWB signal is received and stopping the second counter when the fractional signal changes state.

5. The method as claimed in claim 4 where an arrival time or total delay of the UWB signal is determined by subtracting a fractional delay from an integer delay, wherein the integer delay is determined based on the output of the first counter and the fractional delay is determined based on the output of the second counter.

6. The method as claimed in claim 5 wherein the integer delay is determined based on $$\tau_1 = N_1 \cdot T.$$

7. The method as claimed in claim 6 wherein the fractional delay is determined based on $$\tau_f = N_f \cdot T/K.$$

8. The method as claimed in claim 7 wherein the total delay or arrival time is determined based on $$\Delta = \tau_1 - \tau_f.$$

9. The method as claimed in claim 8 wherein the range is determined based on $$d = (\Delta - x) \cdot \zeta / 2.$$

10. The method as claimed in any one of the preceding claim further comprising determining when the UWB signal is received by determining when an envelope of the received UWB signal is above a threshold.

11. A system for estimating range to an object comprising:
    a transmitter to transmit at least one UWB signal;
    a receiver to receive at least one UWB signal;
    a sampler to sample the received UWB signal depending on a plurality of clock and/or sample pulses having a first frequency, and
    a circuit and/or processor configured to generate a fractional signal having a second frequency that is lower than the first frequency and a phase that is dependant on the delay between when the UWB signal is actually received and when the received UWB signal is first sampled, and determine the range based on at least a first number of clock or sample pulses between transmitting and receiving the UWB signal and the phase of the fractional signal, wherein the circuit and/or processor is also configured to
    start an oscillation signal $^A$ when the UWB signal is received, signal $^A$ having a third frequency which is similar to the first frequency,
    start an oscillation signal $^B$ when the first clock or sample pulse occurs after signal $^A$ starts, signal $^B$ having a fourth frequency which has a relatively small frequency difference to the third frequency,
    multiply signals $^A$ and $^B$ to generate signal $^C$, and
    provide the lower frequency component of signal $^C$ as the fractional signal.

12. The system is claimed in claim 11 further comprising a first counter to start when the UWB signal is transmitted and stop when the received UWB signal is first sampled, wherein the output of the first counter is the first number of clock pulses.

13. The system as claimed in claim 12 further comprising a second clock pulse counter to start when the UWB signal is received and stop when the fractional signal changes state, wherein the output of the second counter is representative of the phase of the fractional signal.

* * * * *